United States Patent
Mann et al.

(10) Patent No.: US 6,328,517 B1
(45) Date of Patent: Dec. 11, 2001

(54) COMBINATION SIDEWALK BOLT

(76) Inventors: Gregory Steven Mann; Gabrielle Marder Mann, both of 10911 NW. 6 Ct., Plantation, FL (US) 33324

( * ) Notice: Subject to any disclaimer, the term of this patent is extended or adjusted under 35 U.S.C. 154(b) by 0 days.

(21) Appl. No.: 09/532,885

(22) Filed: Mar. 22, 2000

Related U.S. Application Data

(60) Provisional application No. 60/127,000, filed on Mar. 25, 1999.

(51) Int. Cl.[7] .............................. F16B 23/00; F16B 35/06
(52) U.S. Cl. ........................... 411/410; 411/404; 411/919
(58) Field of Search ..................... 411/403, 404, 411/410, 919

(56) References Cited

U.S. PATENT DOCUMENTS

| | | |
|---|---|---|
| 2,082,748 | 6/1937 | Brown . |
| 2,140,449 | 12/1938 | Brown . |
| 2,216,381 | 10/1940 | West et al. . |
| 2,322,509 | 6/1943 | Vellier . |
| 2,395,476 | 2/1946 | Givnan . |
| 2,556,155 | 6/1951 | Stellin . |
| 2,800,829 * | 7/1957 | West ...................................... 411/404 |
| 3,237,506 * | 3/1966 | Muenchinger ....................... 411/404 |
| 3,269,250 | 8/1966 | Curtiss . |
| 3,396,765 * | 8/1968 | Ridenour ........................... 411/404 X |
| 4,528,874 * | 7/1985 | Dunn ................................. 411/410 X |
| 4,900,208 | 2/1990 | Kaiser et al. . |
| 5,020,954 | 6/1991 | Dreger . |
| 5,358,368 | 10/1994 | Conlan et al. . |
| 5,674,037 | 10/1997 | Lu . |

* cited by examiner

*Primary Examiner*—Neill Wilson
(74) *Attorney, Agent, or Firm*—Steptoe & Johnson LLP

(57) ABSTRACT

A combination sidewalk bolt is provided. The bolt includes a head portion, a threaded shaft portion extending perpendicularly outward from a first side of the head portion, a Phillips head recess well formed within a second side of the head portion for use in driving the bolt, and a slotted screwdriver slot provided in the second side of the head portion. A depth of the recess well is greater than the width of the head portion between the first side and the second side.

14 Claims, 2 Drawing Sheets

Fig. 3
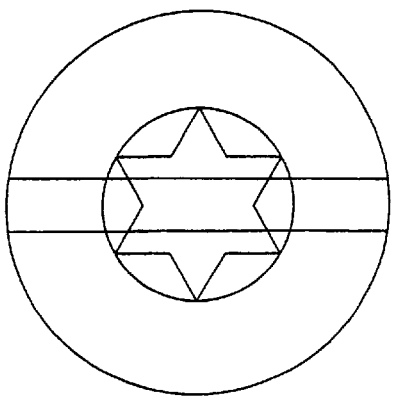
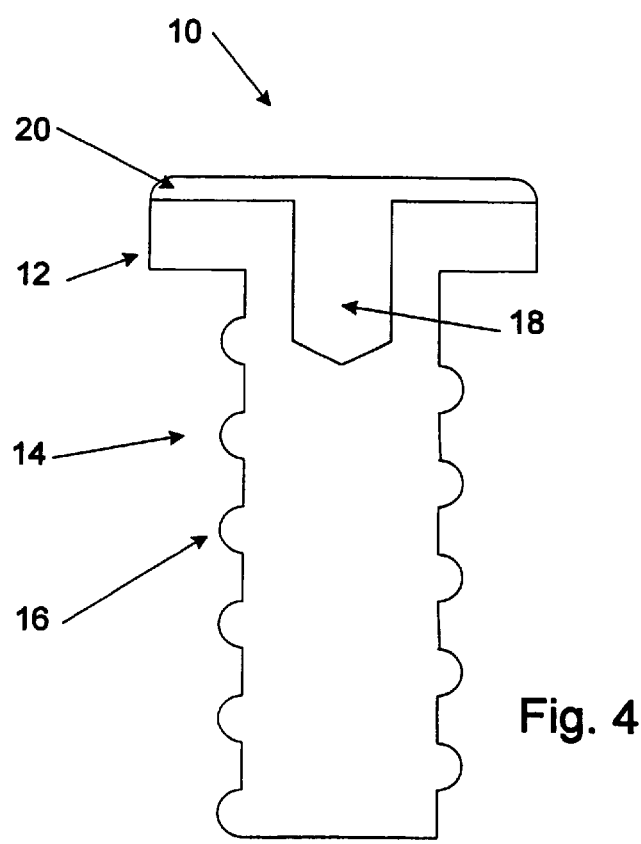
Fig. 2
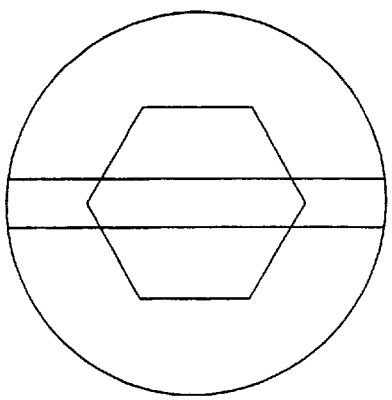
Fig. 4

COMBINATION SIDEWALK BOLT

The present application claims the benefit of priority to U.S. Provisional Application No. 60/127,000, filed on Mar. 25, 1999.

BACKGROUND OF THE INVENTION

Hurricane shutters comprise a major portion of the hurricane protection industry. Hurricane shutters can be affixed to a structure in several different ways depending on the particular requirements of each job combined with the published test results of each individual shutter. Shutters can be affixed directly to the substraight or installed into various tracks (i.e. f track, u headers studded angle etc). In many cases, a sidewalk bolt is the preferred bolt be cause of its low head profile and large diameter head. The combination Sidewalk Bolt is the preferred bolt because it gives the advantage of using a phillips or slotted drive to install and remove these screws. In most cases, the sidewalk bolts need to be removed or loosened to hang the hurricane shutters.

Combination sidewalk bolts are constructed with a large diameter and low profile head allowing the screw to be used on a floor or on a wall without being a hazard to the public. The large diameter head is usually preferred because the there is a larger portion of the fastener holding the shutters or tracks in place. Because of the thin profile of the head of the bolt, it has only been possible to construct these bolts with a slotted head. While advantages are obtained when bolts are provided with a Phillips head, particularly in the ease of use, it has not been possible to provide a combination sidewalk bolts with such a head following generally accepted design principles. In particular, the depth of the recess of the Phillips drive which is required for the Phillips drive exceeds accepted limits in comparison to the height of the bolt head.

A need therefore has existed for a combination sidewalk bolt which is provided with a Phillips drive.

SUMMARY OF THE INVENTION

The need for a combination sidewalk bolt constructed with a Phillips head has been satisfied by the present invention wherein in one aspect of the invention a combination sidewalk bolt is provided with a head portion having a threaded shaft portion extending perpendicularly outward from a first side. A Phillips head recess well is formed in a second side of said head portion wherein the depth of the recess well is at least eight tenths of the width between the first side and second side of the head portion. In another aspect of the invention the Phillips head recess well extends into the shaft of the bolt.

BRIEF DESCRIPTION OF THE DRAWINGS

FIG. 2 is a top view of a bolt in accordance with an embodiment of the present invention having a hex head recess well.

FIG. 3 is a top view of a bolt in accordance with an embodiment of the present invention having a torx head recess well.

FIG. 4 is a cross section of the embodiment shown in FIG. 1.

DETAILED DESCRIPTION OF A PREFERRED EMBODIMENT

Figure 1:
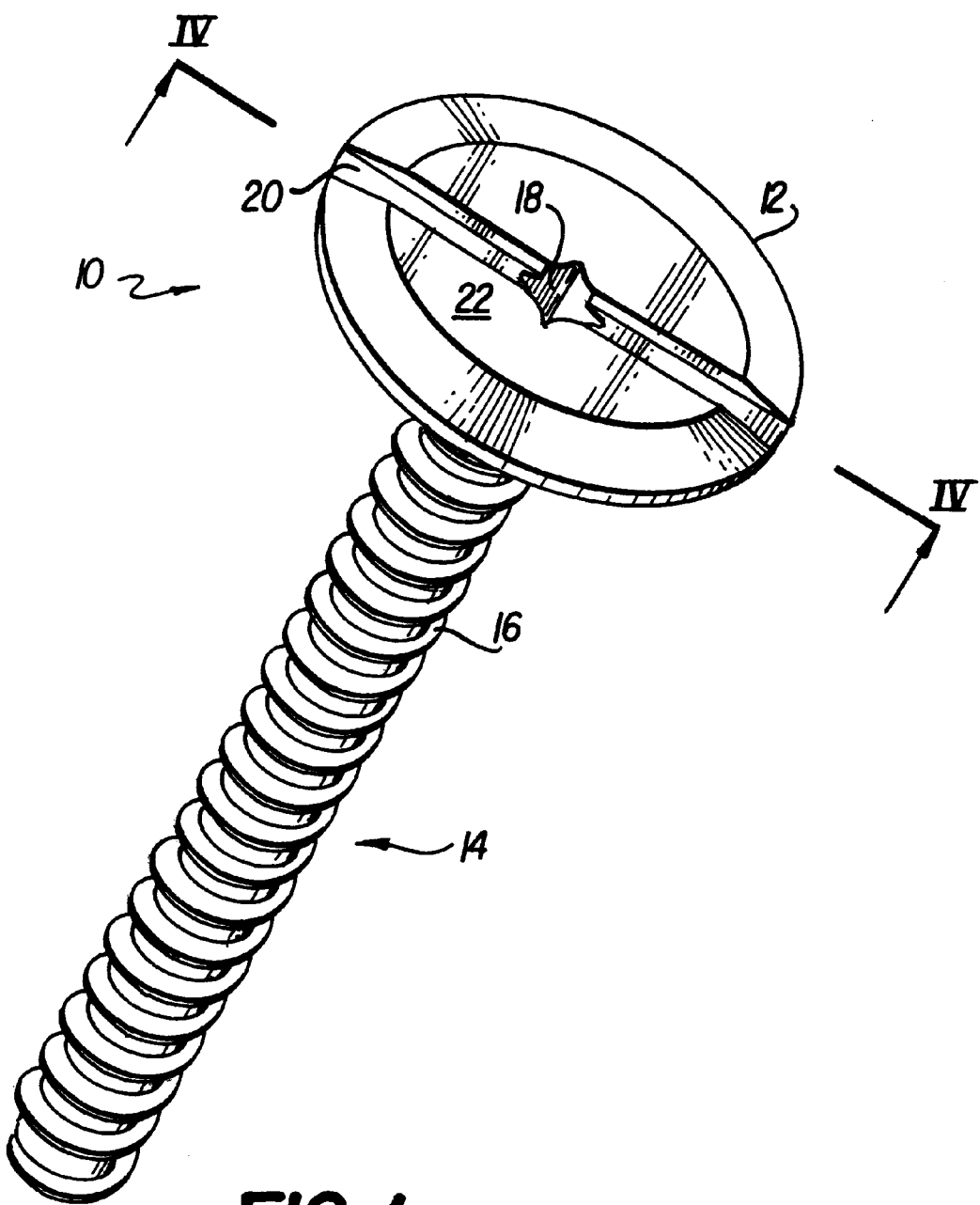
FIG. 1 is a perspective view of a bolt in accordance with an embodiment of the present invention.

Referring now to FIG. 1, wherein a combination sidewalk bolt 10 in accordance with a preferred embodiment is depicted, the bolt 10 includes a head portion 12 connected to a shaft portion 14 which has threads 16. In a preferred embodiment of the present invention the head portion 12 and shaft portion 14 are cast from an integral piece of steel or other material.

The head portion 12 has both a standard #3 Phillips head recess well 18 and a slotted screwdriver well 20 formed in the side opposite the shaft portion 14. The head portion 12 measures approximately 0.750 inches in diameter, has a width of approximately 0.110 inches and an inside head diameter 22 that measures approximately 0.510 inches.

The threads 16 of the preferred embodiment are ¼–20 but can also be provided in other thread sizes. The specifications of the threads 16, including thread major diameter, are consistent with the Industrial Fasteners Institute (IFI) standards. For a ¼–20 bolt the thread major diameter is approximately 0.245 inches.

The Phillips head recess well 18 of a preferred embodiment is for a standard #3 Phillips screwdriver. The length across the Phillips head recess well 18, when measured across the outer most surface of the head portion 12, is approximately 0.256 inches. The depth of the Phillips recess well 18 when measured from the outer most surface of the head portion 12 is at least 0.090 inches. In a preferred embodiment, the depth of the Phillips head recess well 18 is 0.120 inches and the well extends down through the head portion 12 into the shaft portion 14.

The above-description and drawing are only illustrative of one preferred embodiment which achieves the features and advantages of the present invention, and it is not intended that the present invention be limited thereto. Any modification of the present invention which comes within the spirit and scope of the following claims is considered part of the present invention. In particular, it should be readily understood that a combination sidewalk bolt having a Phillips head and no slotted screwdriver well could be provided without departing from the spirit and scope of the present invention. In accordance with the present invention it would also be possible to provide other types of bolt heads including torx and hex wells.

What is new and desired to be protected by Letters Patent of the United States is:

1. A combination sidewalk bolt, comprising:
   a head portion;
   a threaded shaft portion extending perpendicularly outward from a first side of said head portion;
   a Phillips head recess well formed within a second side of said head portion for use in driving said bolt; and
   a slotted screwdriver slot provided in said second side of said head portion;
   a depth of said recess well being greater than the width of the head portion between said first side and said second side.

2. The bolt of claim 1 wherein said Phillips head recess well is a standard #3 Phillips screwdriver size.

3. The bolt of claim 2 wherein the head portion is three quarters of an inch in diameter and greater than one tenth of an inch in width between the first side and the second side.

4. The bolt of claim 1 wherein the head portion is three quarters of an inch in diameter and greater than one tenth of an inch in width between the first side and the second side.

5. The bolt of claim 1 wherein the width of the head portion between the first side and the second side is 0.11 inches and the depth of the recess well is 0.12 inches.

6. The bolt of claim 5 wherein the threaded shaft portion has ¼–20 threads.

7. The bolt of claim 6 wherein said first side of said head portion has a flat portion a half inch in diameter.

8. The bolt of claim 7 wherein said bolt is made from steel.

9. A combination sidewalk bolt, comprising:

a head portion;

a threaded shaft portion extending perpendicularly outward from a first side of said head portion;

a torx head recess well formed within a second side of said head portion for use in driving said bolt; and a slotted screwdriver slot provided in said second side of said head portion;

a depth of said recess well being greater than the width of the head portion between said first side and said second side.

10. A combination sidewalk bolt, comprising:

a head portion;

a threaded shaft portion extending perpendicularly outward from a first side of said head portion;

a hex head recess well formed within a second side of said head portion for use in driving said bolt; and a slotted screwdriver slot provided in said second side of said head portion;

a depth of said recess well being greater than the width of the head portion between said first side and said second side.

11. A combination sidewalk bolt comprising:

a head portion that is three quarters of an inch in diameter;

a threaded shaft portion extending perpendicularly outward from a first side of said head portion;

a standard #3 Phillips head recess well and a slotted screwdriver slot formed within a second side of said head portion;

wherein the depth of said Phillips head recess well is greater than the width of the head portion between said first side and said second side.

12. The bolt of claim 11 wherein the width of the head portion between the first side and the second side is 0.11 inches and the depth of the recess well is 0.12 inches.

13. The bolt of claim 12 wherein the threaded shaft portion has ¼–20 threads.

14. The bolt of claim 13 wherein said first side of said head portion has a flat portion a half inch in diameter.

\* \* \* \* \*